INVENTOR.
WALTER FROEDE
BY Thomas W. Kennedy
ATTORNEY

March 31, 1964     W. FROEDE     3,127,096
APEX SEALING MEANS

Filed June 27, 1962     3 Sheets-Sheet 2

INVENTOR.
WALTER FROEDE
BY
Thomas W. Kennedy
ATTORNEY

March 31, 1964     W. FROEDE     3,127,096
APEX SEALING MEANS

Filed June 27, 1962     3 Sheets-Sheet 3

INVENTOR.
WALTER FROEDE
BY
Thomas W. Kennedy
ATTORNEY 3,127,096
APEX SEALING MEANS
Walter Froede, Neckarsulm, Wurttemberg, Germany, assignor to NSU Motorenwerke Aktiengesellschaft, Neckarsulm, Germany, and Wankel G.m.b.H., Lindau (Bodensee), Germany
Filed June 27, 1962, Ser. No. 205,625
Claims priority, application Germany July 7, 1961
3 Claims. (Cl. 230—145)

The present invention relates broadly to the art of rotary mechanisms and is particularly directed to sealing means for such rotary mechanisms.

The invention is particularly useful in connection with rotary mechanisms similar to that disclosed in United States Patent Number 2,988,065 although as will become apparent, this invention is not limited to this specific type of rotary mechanism. In the following description the invention is described in relation to an internal combustion engine but the invention is also suitable for fluid pumps and fluid motors.

A rotary engine as disclosed in said patent comprises an outer body or housing having a cavity therein and an inner body or rotor disposed therein rotatable relative to the outer body, about an axis laterally spaced from, but parallel to the axis of said cavity. The inner body is journaled on an eccentric portion of a shaft which is coaxial with the outer body and journaled in bearings carried by the outer body end walls. The outer body has axially-spaced end walls and a peripheral wall interconnecting the end walls to form said cavity; the inner surface of the cavity peripheral wall having a multi-lobed profile which preferably is basically an epitrochoid. The inner body or rotor has end faces disposed adjacent to said outer body end walls for sealing cooperation therewith and has a peripheral surface with a plurality of circumferentially-spaced apex portions, each carrying a radially-movable seal or seal means for sealing engagement with the multi-lobed inner surface of the outer body peripheral wall to form a plurality of working chambers between the two bodies which vary in volume upon relative rotation of the two bodies. Each apex seal of the inner body runs axially, separating the adjacent working chambers, and is received within an outwardly-facing groove running axially from one end face to the other of the inner body at its associated apex portion on the inner body.

Prior combustion engines of this type have apex seals, which are one piece, rectangular in elevation view, and having square-cut ends. Because of the difference in longitudinal thermal expansion between the apex seals and the outer body, it is necessary to provide clearances or gaps between the end faces of the apex seals and the flat inner surfaces of the adjacent outer-body end walls. On occasion, the apex seals may bear first against one end wall and then against the other end wall of the outer body because of an axial play of the apex seals, so that the apex seals may tilt about their transverse axis, which may tend to jam the apex seals between the end walls. Accordingly, the aforementioned prior art form of apex seal strips may lead to poor sealing, and also jamming between the end wall which makes the strips unworkable and scars the sealing surfaces.

An object of the present invention comprises the provision of a rotary combustion engine in which a novel apex seal arrangement for the working chambers is provided to maintain continuous and improved sealing during engine operation.

Specifically, instead of providing single piece apex seals in bearing against the inner surface of the peripheral wall and having sealing cooperation with the end walls, this invention provides apex seals, such comprising a two-piece seal strip in which the radially outward part is in bearing against both the inner surface of the peripheral wall and against one of the end walls, and the radially inward part is in bearing aginst the other end wall of the outer body.

Thus, each of the improved apex seal means, by being in bearing simultaneously at both end faces, avoids axially play and movement, and presents tilting and jamming of the apex seal means, and thus provides good sealing.

A further object of the invention is to provide a spring means for urging each apex seal means radially-outward for bearing against the peripheral-wall inner surface as well as axially apart for bearing against each said outer-body end wall. Hence, each apex seal means is movable in three directions for simultaneous bearing against three separate sealing surfaces by the urging of a single spring.

Another feature of the invention resides in the provision of a pair of apex seal strips of the aforementioned novel construction in each groove, which are oppositely disposed, with each strip covering the joint and all the gaps in the adjacent strip that result from its two piece construction, to furnish effective sealing of the working chambers.

Other objects of the invention will become apparent upon reading the annexed detail description in connection with the drawings in which.

Figure 1:
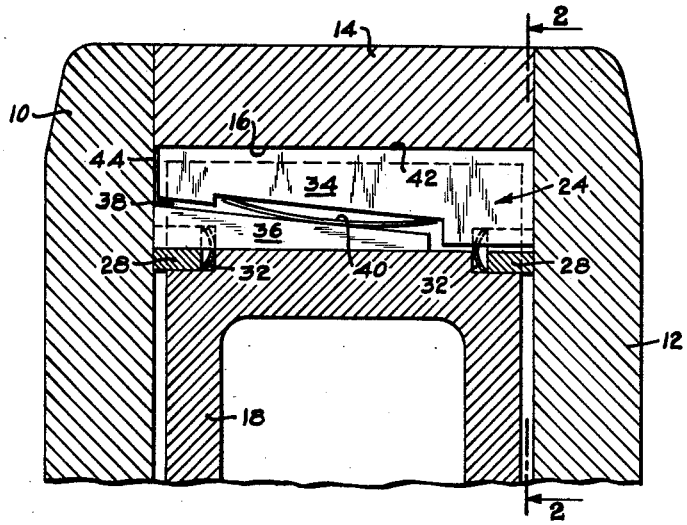
FIGURE 1 is a partial, longitudinal, sectional view through a rotor apex portion and groove, showing the apex seal strip in accordance with the invention.

Referring to the drawings, a housing of a rotary combustion engine comprises spaced end walls 10 and 12, and a peripheral wall 14 disposed between and interconnecting said end walls to form a cavity therebetween. The inner surface 16 of the peripheral wall 14 preferably has a multi-lobed profile in cross-section which is basically an epitrochoid.

Inside and eccentric to the housing is disposed an inner body or rotor 18, having a plurality of circumferentially-spaced apex portions 20 about its outer periphery. Each of said apex portions 20 has radially-movable apex seal means 24 received within a single outwardly-facing groove 22 extending in a direction parallel to the rotor axis from one end face to the other of the rotor 18 and urged radially outward into sealing engagement with the peripheral wall inner surface 16. The inner body 18 also has end faces having end-face seal means 26 and intermediate seal elements 28 disposed in sealing engagement with the end walls 10 and 12 to form a plurality of working chambers 30 which vary in volume upon rotation of the inner body 18 relative to the stationary outer body.

The bottom of each apex groove 22 has an enlarged cylindrical portion at each end of the groove, and an axially-movable intermediate seal element 28 is slidably fitted within such cylindrical portion and urged axially against the end wall 10 or 12 by gas pressure and a spring 32. Each end of each apex seal means 24 is in sealing cooperation with an intermediate seal element 28. Between the intermediate seal elements 28, disposed at the rotor apex portions 20 on each end face of the rotor 18 adjacent to the rotor periphery, and associated with a working chamber 30, are end face seal means 26, each of which extends from one intermediate seal element 28 to an adjacent element 28.

During rotation of the inner body 18, the apex seal means 24 slide continuously along and in bearing against the inner surface 16 of the peripheral wall 14, and the intermediate seal elements 28 and the end face seal means 26 slide continuously along the flat inner surfaces of the end walls 10 and 12.

The engine so far described is substantially similar to the engine disclosed in the aforementioned United States Patent Number 2,988,065 and for additional description reference is made to said patent. The seal arrangement so far described is substantially similar to the seal arrangements disclosed in the aforementioned United States Patent Number 3,033,180 and reference is made to said patent.

According to FIGURE 1, each apex seal means 24 has a two-part construction, a radially outer part 34 and a radially inner part 36 with the facing surfaces of said parts being inclined to the rotor axis along a junction region indicated at 38. With this construction each of the seal parts has a relatively wide end, as viewed in FIGURE 1. A spring 40 is disposed in the junction 38 between the two parts 34 and 36 of each apex seal means 24. Each spring 40 is effective to urge the outer edge 42 of its associated outer part 34 against the peripheral wall inner surface 16 and to urge said outer part axially toward the end wall 12 so that the end face of its wide end is held in sealing engagement with said end wall thereby leaving a clearance or gap 44 at the other end wall 10. At the same time, each spring 40 urges its associated inner seal part 36 axially toward the other end wall 10 so that the end face of its wide end is held in sealing engagement with this latter end wall 10. Hence, because of the inclination to the peripheral wall inner surface 16 of the facing edges of each pair of seal parts 34 and 36 at their junction 38, a single spring 40 is effective to urge the outer seal part 34 radially outwardly toward the peripheral wall inner surface 16 and axially toward the end wall 12, while the inner seal part is urged axially in the other direction toward the end wall 10. The gas pressure in the working chambers 30 may also be used to hold the seal parts 34 and 36 in said sealing engagement with the outer body. Thus, this gas pressure enters the apex seal grooves 22 and is effective preferably with a spring 40 to maintain said sealing engagement of the seal parts 34 and 36 with the outer body walls 10, 12 and 14.

The wide ends of each apex seal means 24 are in sealing engagement with intermediate seal elements 28, which are urged axially outward in sealing cooperation with the end walls 10 and 12 by springs 32 and by gas pressure, for sealing the working chambers 30, as described previously.

Because the outer part 34 of each apex seal means 24 is urged by spring means 40 in constant and simultaneous bearing against both the peripheral-wall inner surface 16 and one wall 12 of the outer body, while the inner part 36 is urged in bearing against the other end wall 10, there is no axial play or movement in the apex seal means 24. Thus, since each apex seal means 24 does not tend to tilt lengthwise or to tip about its transverse axis, jamming of the apex seal means 24 between the end walls 10 and 12 is avoided.

Since the inner seal part 36 of each apex seal means 24 is also urged by spring means 40 in bearing against the flat surfaces of the other end wall 10 of the outer body, the only gap 44 present in the apex seal means is at the narrow end of the outer seal part 34. This gap 44 can be minimized if the juncture portion 38 is steeply inclined, so that the width of the narrow end of the outer part 34 is reduced. As the end gap 44 is small and as the space of the juncture portion 38 is sealed by a side wall of the groove 22, the apex seal means 24 effectively seals the chambers 30.

Figure 2:
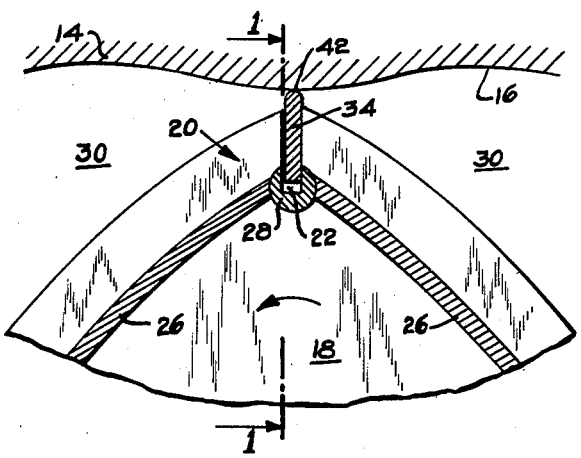
FIGURE 2 is a partial view of a rotor apex portion and seal strip, as taken along line 2—2 of FIGURE 1.
Figure 3:
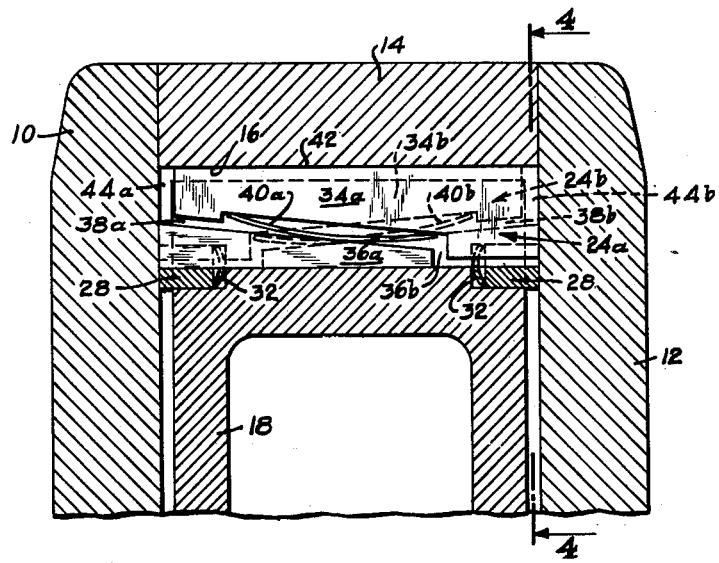
FIGURE 3 is a view similar to FIGURE 1, showing a pair of seal strips in accordance with the invention, as taken along line 3—3 of FIGURE 4.
Figure 4:
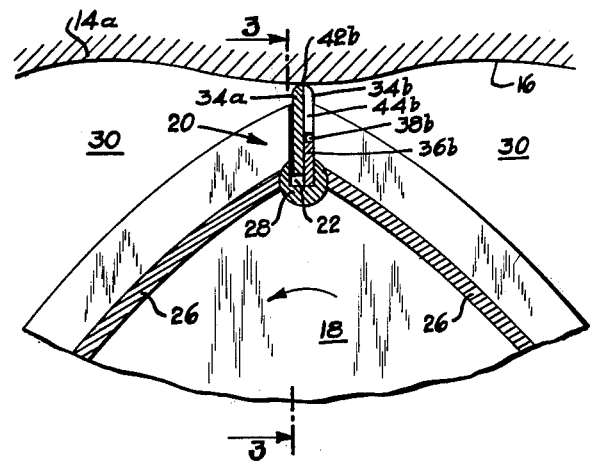
FIGURE 4 is a view similar to FIGURE 2, showing a pair of seal strips, as taken along 4—4 of FIGURE 3.

As already stated, in FIGURE 1, a small gap 44 is left between each outer seal part 34 and the adjacent end wall 10. To close this gap each apex seal groove 22 preferably has a pair of apex seal means 24a and 24b as illustrated in FIGURES 3 and 4, in place of a single apex seal means 24 as in FIGURE 1. The engine of FIGURE 3 is otherwise identical with that of FIGURES 1 and 2.

As shown in FIGURES 3 and 4, each apex seal means 24a and 24b is substantially identical with the apex seal means 24 in FIGURE 1, except the apex seal means 24b is oppositely disposed in its groove 22 so that it in effect is a mirror image of its adjacent apex seal means 24a. Thus, the diagonal junction region 38a between the inner and outer parts of an apex seal means 24a is oppositely inclined to the peripheral wall inner surface 16 compared to the diagonal junction region 38b between the inner and outer parts of the adjacent apex seal means 24b. Hence, the spring 40a in one apex seal means 24a urges its outer seal part 34a axially against one end wall 12 while the spring 40b in the other apex seal means 24b of the pair urges its outer seal part 34b axially against the other end wall 10.

In this way, the gap 44a left by the outer part 34a of the first apex seal means 24a between its narrow end face and adjoining end wall 10 is sealed by the outer part 34b of the other apex seal means 24b of the pair. Similarly, the gap 44b left by the other apex seal means 24b is sealed by the first apex seal means 24a.

Figure 5:
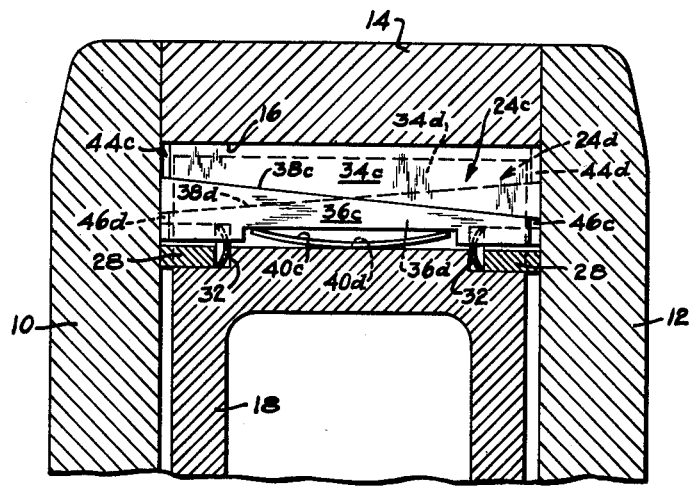
FIGURE 5 is another view similar to FIGURE 1, showing a pair of seal strips of different form.

In the form of apex seal means illustrated in FIGURE 5 the spring for the two parts of the seal are disposed below both seal parts rather than between them as in FIGURES 1 through 4. FIGURE 5, like FIGURES 3 and 4, shows two similar but oppositely disposed apex seal means 24c and 24d in each apex groove 22 of the rotor 18. It will be understood however that each rotor apex groove 22 may have but a single apex seal means as in FIGURES 1 and 2. The engine of FIGURE 5 is otherwise identical to the engines in FIGURES 1 and 3.

In FIGURE 5, each groove 22 has a pair of apex seal means 24c and 24d. Each apex seal means 24c or 24d is a two-part construction with an outer part 34c or 34d and an inner part 36c or 36d having facing surfaces inclined to the rotor axis along a junction region 38c or 38d, which runs from one end face to the other of the apex seal means 24c or 24d. Each part 34c, 34d, 36c and 36d is wedge-shaped having one end narrower than the other with a gap 44c, 44d, 46c and 46d adjacent to the narrow end, thus giving four gaps per each pair of apex seal means.

To seal these gaps the apex seal means 24d is oppositely disposed in its groove 22 so that it is in effect a mirror image of its adjacent and identical apex seal means 24c. Their diagonal junctures 38c and 38d are also oppositely inclined. In this way, the gaps 44c and 46c at the narrow end of the parts 34c and 36c of one apex seal means 24c are covered and sealed by the wide ends of the adjacent parts 34d and 36d of the other apex seal means 24d. Similarly, the gaps 44d and 46d in the latter apex seal means 24d are sealed by the former apex seal means 24c. The gaps 46c and 46d at the narrow ends of the inner parts 36c and 36d are preferably also sealed by the intermediate seal elements 28.

A spring 40c and 40d for each apex seal means 24c and 24d is disposed below each inner part 36c and 36d to urge it outwardly to bear against its associated outer part 34c and 34d along the inclined facing surfaces at their juncture region 38c and 38d thereby causing the wide end faces of the parts 34c, 36c, 34d and 36d to sealingly engage the end walls adjoining them, and causing each outer part 34c and 34d to sealingly engage the peripheral wall inner surface 16.

Because of the inclination of its juncture region 38c or 38d and the action of its spring 40c or 40d, each apex seal means 24c or 24d is in sealing engagement with three walls 10, 12 and 16 of the housing. Furthermore, in the form shown in FIGURE 5, due to the sealing engagement between the outer and inner parts 34c and 36c or 34d and 36d along their facing surfaces, there is no leakage through this juncture region 38c and 38d even when an apex seal means 24c or 24d is used singly, and when it happens to float between the groove side walls due to equal pressure in adjoining chambers 30.

Thus, the pair of apex seal means 24c and 24d shown in FIGURE 5, is effective to seal the working chambers 30 and to avoid jamming between the end walls 10 and 12; and the apex seal means are free from axial play and tilting. Furthermore, the apex seal means 24c and 24d avoid axial vibration and chattering because the frictions on their end faces from the end walls 10 and 12 dampen vibration.

The various improvements of the invention provide improved sealing during engine operation, reduce maintenance on sealing surfaces and increase the life of the engine.

While I have described my invention in detail in its present preferred embodiment, it will be obvious to those skilled in the art after understanding my invention that various changes and modifications may be made therein without departing from the spirit or scope thereof.

What is claimed is:

1. A rotary mechanism comprising an outer body having spaced end walls and a peripheral wall forming a cavity therebetween; said outer body having an axis along which said end walls are spaced; and an inner body disposed within said outer body for rotation relative to said outer body; said inner body having an axis laterally spaced from but parallel to said outer body axis; said inner body having a plurality of radially-movable apex seal means circumferentially spaced about its periphery, each received within an outwardly-facing groove extending from one end face to the other of said inner body; each said apex seal means having an outer edge in sealing contact with the inner surface of the peripheral wall to form a plurality of working chambers between said bodies which vary in volume upon rotation of said bodies; each said apex seal means having a multi-part construction comprising a radially outer part and a radially inner part with the outer part having its outer edge engageable with the inner surface of said peripheral wall and having one end engageable with one end wall and with the inner part having one end engageable with the other end wall, the facing surfaces of the inner and outer parts of each apex seal means being inclined to the inner body axis basically along a common plate of inclination, each radially outer part being provided with a pair of integral end legs with a separating recess therebetween running through in the peripheral direction, one end leg extending substantially to the bottom of the respective inner body groove and the other substantially to said plane of inclination, and spring means disposed in each separating recess for urging the two parts of the respective apex seal means axially and also radially apart for sealing engagement with the outer body end walls and peripheral wall.

2. A rotary mechanism as claimed in claim 1 and in which a pair of said apex seal means are received in each said inner body groove with the two apex seal means in each groove being oppositely disposed therein so that the facing surfaces of the two parts of one of said apex seal means are oppositely inclined to the inner body axis compared to the inclination of the facing surfaces of the two parts of the other of said apex seal means whereby the two outer parts of the apex seal means in a given groove cooperate to completely seal off the working chambers adjacent to such groove.

3. A rotary mechanism comprising an outer body having spaced end walls and a peripheral wall forming a cavity therebetween; said outer body having an axis along which said end walls are spaced; and an inner body disposed within said outer body for rotation relative to said outer body; said inner body having an axis laterally spaced from but parallel to said outer body axis; said inner body having a plurality of radially-movable apex seal means circumferentially spaced about its periphery, each received within an outwardly-facing groove extending from one end face to the other of said inner body; each said apex seal means having an outer edge in sealing contact with the inner surface of the peripheral wall to form a plurality of working chambers between said bodies which vary in volume upon rotation of said bodies; each said apex seal means having a multi-part construction comprising:

a first and second radially outer part and a first and second radially inner part, one pair of like-numbered parts being split apart from the other pair along a generally radially extending splitting plane, each radially outer part being split from its like-numbered radially inner part along a splitting plane that is inclined with respect to the inner body axis and generally transverse with respect to said radial splitting plane, each inclined plane being so oriented as basically to constitute the radial-splitting-plane-surface of the respective inner part and of the respective outer part right-angular trapezoids, the two plane inclinations being oppoiste, each inner part being provided with a pair of end legs separated by a recess, and spring means seated in the recesses and in engagement with the respective groove bottom and the respective inner parts for urging the respective inner and outer parts to sealing engagement with the inner body peripheral and end walls and completely sealing off from one another the working chambers adjacent to the given apex seal means.

References Cited in the file of this patent

UNITED STATES PATENTS

| | | |
|---|---|---|
| 1,582,922 | Freud | May 4, 1926 |
| 1,854,692 | Cooper | Apr. 19, 1932 |
| 2,027,594 | Huff | Jan. 14, 1936 |
| 2,049,211 | Loweke | July 28, 1936 |
| 2,522,824 | Hicks | Sept. 19, 1950 |
| 3,064,880 | Wankel | Nov. 20, 1962 |

FOREIGN PATENTS

| | | |
|---|---|---|
| 590,085 | France | June 10, 1925 |